US011333028B2

(12) United States Patent
Congratel et al.

(10) Patent No.: US 11,333,028 B2
(45) Date of Patent: May 17, 2022

(54) TURBOMACHINE VANE WITH INTEGRATED METAL LEADING EDGE AND METHOD FOR OBTAINING IT

(71) Applicant: SAFRAN AIRCRAFT ENGINES, Paris (FR)

(72) Inventors: Sébastien Serge Francis Congratel, Moissy-Cramayel (FR); Célia Iglesias Cano, Moissy-Cramayel (FR); Antoine Hubert Marie Jean Masson, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 120 days.

(21) Appl. No.: 16/879,171

(22) Filed: May 20, 2020

(65) Prior Publication Data

US 2020/0370438 A1 Nov. 26, 2020

(30) Foreign Application Priority Data

May 21, 2019 (FR) ...................................... 1905301

(51) Int. Cl.
*F01D 5/28* (2006.01)
*B29C 33/12* (2006.01)
(Continued)

(52) U.S. Cl.
CPC .............. *F01D 5/282* (2013.01); *B29C 33/12* (2013.01); *F01D 5/147* (2013.01); *F01D 5/286* (2013.01);
(Continued)

(58) Field of Classification Search
CPC . F01D 5/28; F01D 5/282; F01D 5/286; F04D 29/384; F03D 2300/603; F05D 2300/603
See application file for complete search history.

(56) References Cited

U.S. PATENT DOCUMENTS

2011/0294941 A1* 12/2011 Fujimoto ............... B82Y 30/00
524/497
2016/0177969 A1   6/2016 Schreiber et al.
2018/0238174 A1*  8/2018 Gonzalez-Gutierrez ....................
F04D 29/668

FOREIGN PATENT DOCUMENTS

EP    3 027 394 A1    6/2016
EP    3 034 788 A2    6/2016
(Continued)

OTHER PUBLICATIONS

Machine Translation of FR 3010132 (Year: 2015).*
Search Report as issued in French Patent Application No. 1905301, dated Dec. 3, 2019.

*Primary Examiner* — David E Sosnowski
*Assistant Examiner* — Maxime M Adjagbe
(74) *Attorney, Agent, or Firm* — Pillsbury Winthrop Shaw Pittman LLP

(57) ABSTRACT

A turbomachine vane includes a blading made of composite material with fibrous reinforcement densified by a matrix and an integrated metal leading edge, the blading extending in a longitudinal direction, the leading edge being formed by a metal foil overmolded onto the blading, the foil having a lower wing and an upper wing which extend respectively on the lower and upper faces of the blading while matching an aerodynamic profile of the vane. One of the lower wing and the upper wing has a positioning portion extending in the longitudinal direction, the portion having a flat inner face and an increasing thickness away from the leading edge, and being housed in a correspondingly shaped groove in the blading.

9 Claims, 9 Drawing Sheets

(51) Int. Cl.
*F01D 5/14* (2006.01)
*B29D 99/00* (2010.01)
(52) U.S. Cl.
CPC ...... *B29D 99/0025* (2013.01); *F05D 2230/53* (2013.01); *F05D 2300/603* (2013.01); *F05D 2300/702* (2013.01)

(56) References Cited

FOREIGN PATENT DOCUMENTS

| | | |
|---|---|---|
| FR | 3 010 132 A1 | 3/2015 |
| WO | WO 2013/021141 A1 | 2/2013 |
| WO | WO 2015/015091 A1 | 2/2015 |

* cited by examiner

[Fig. 1]
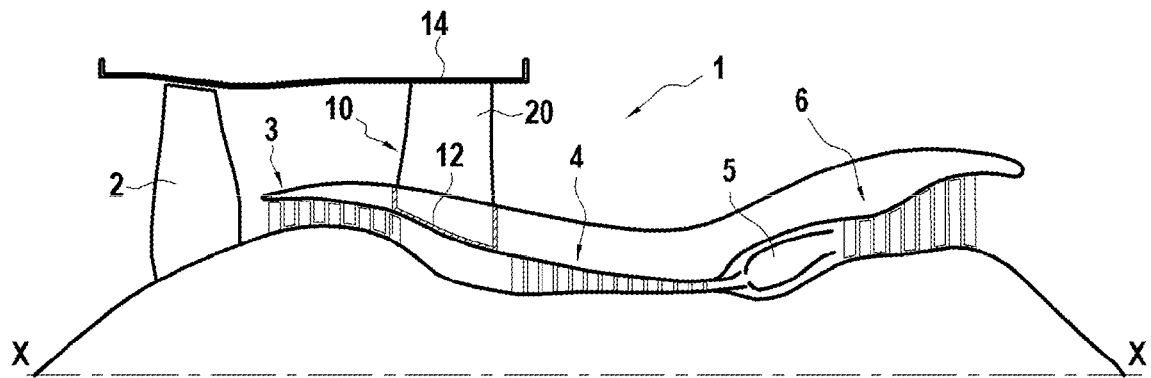
[Fig. 2]
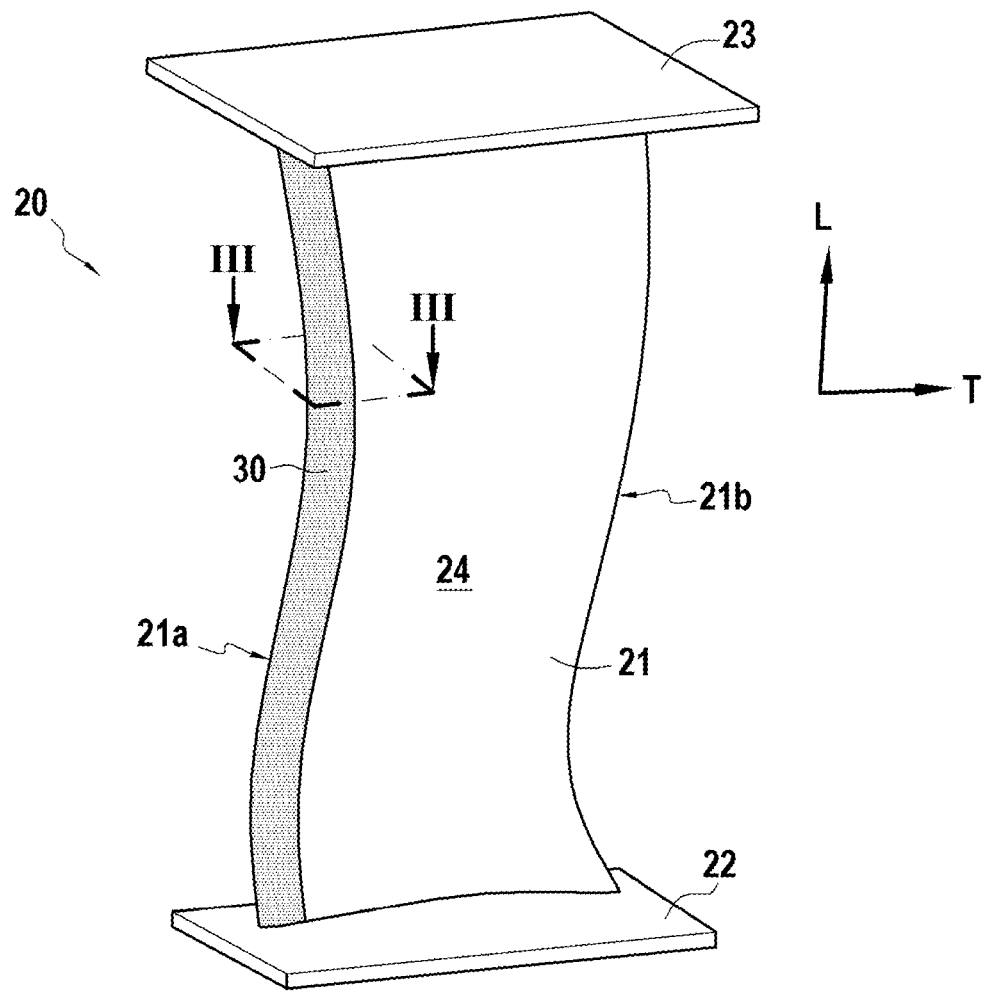

[Fig. 3]
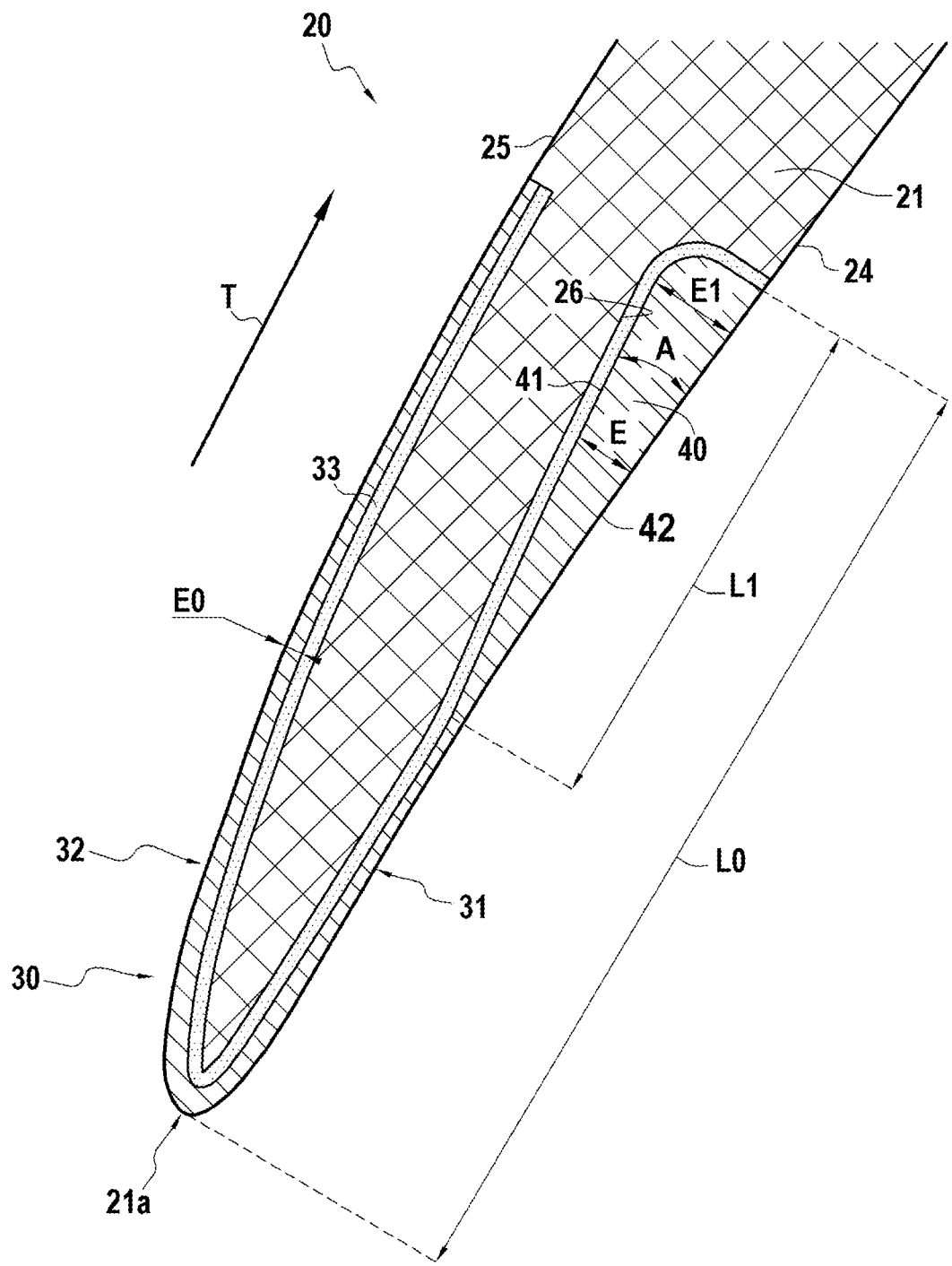

[Fig. 4]
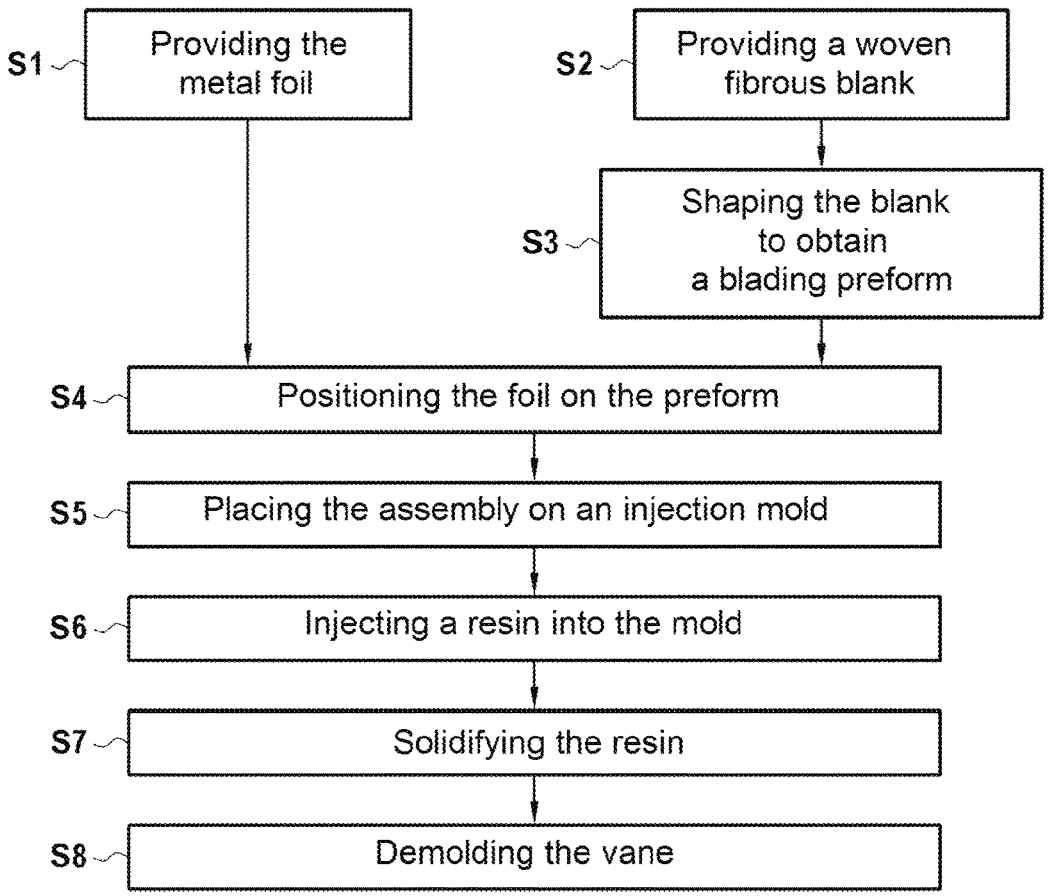
[Fig. 5]
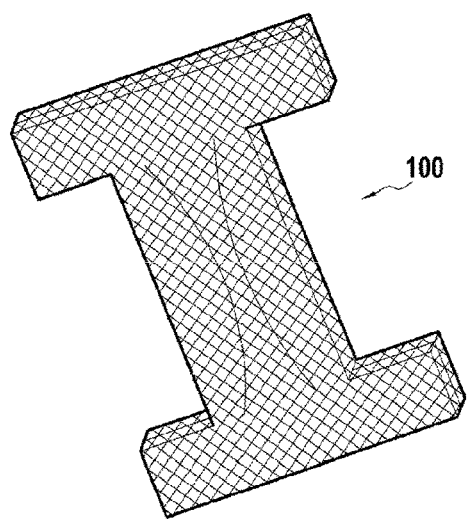

[Fig. 6]
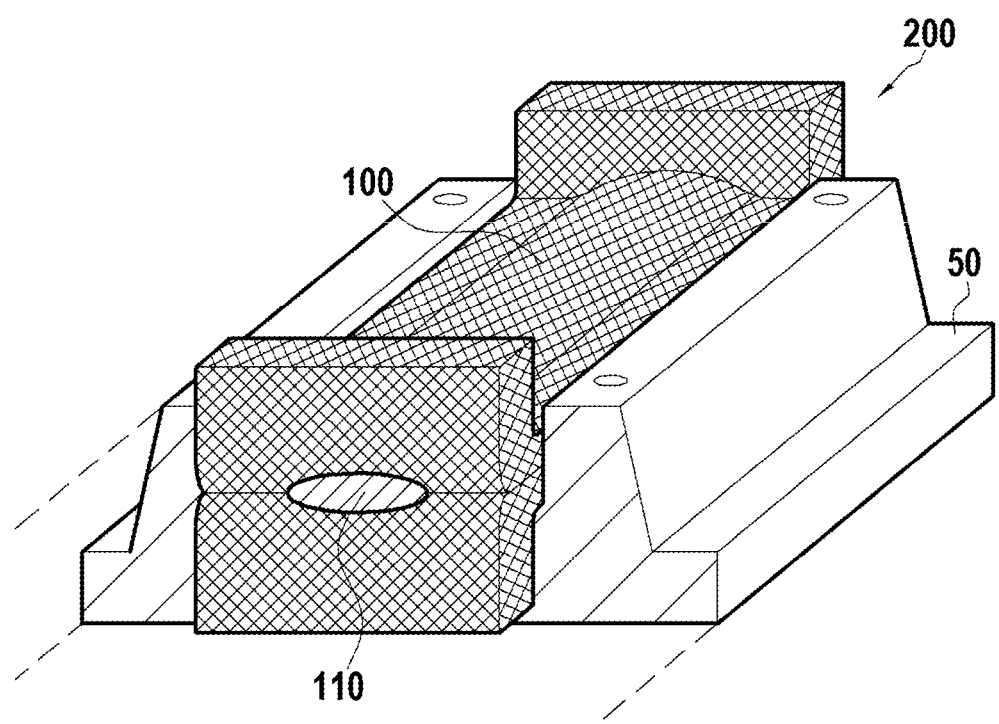
[Fig. 7]
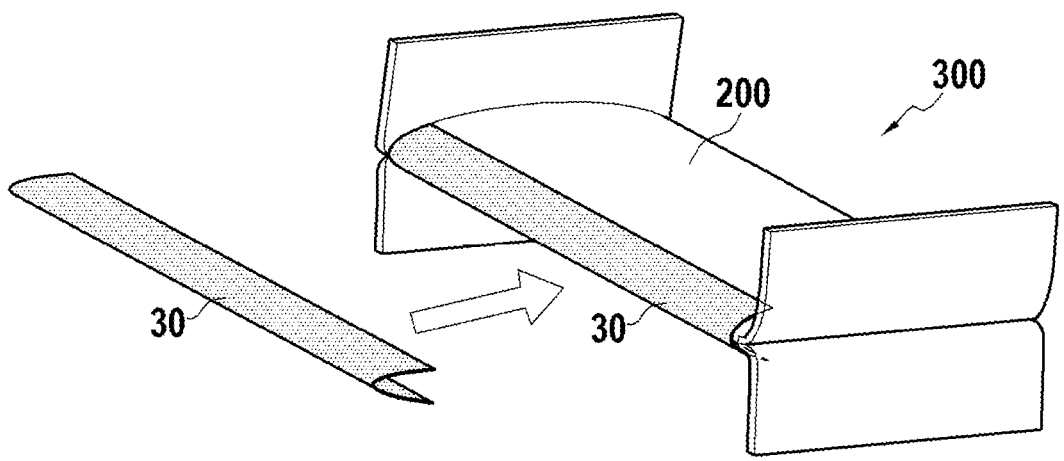

[Fig. 8A]
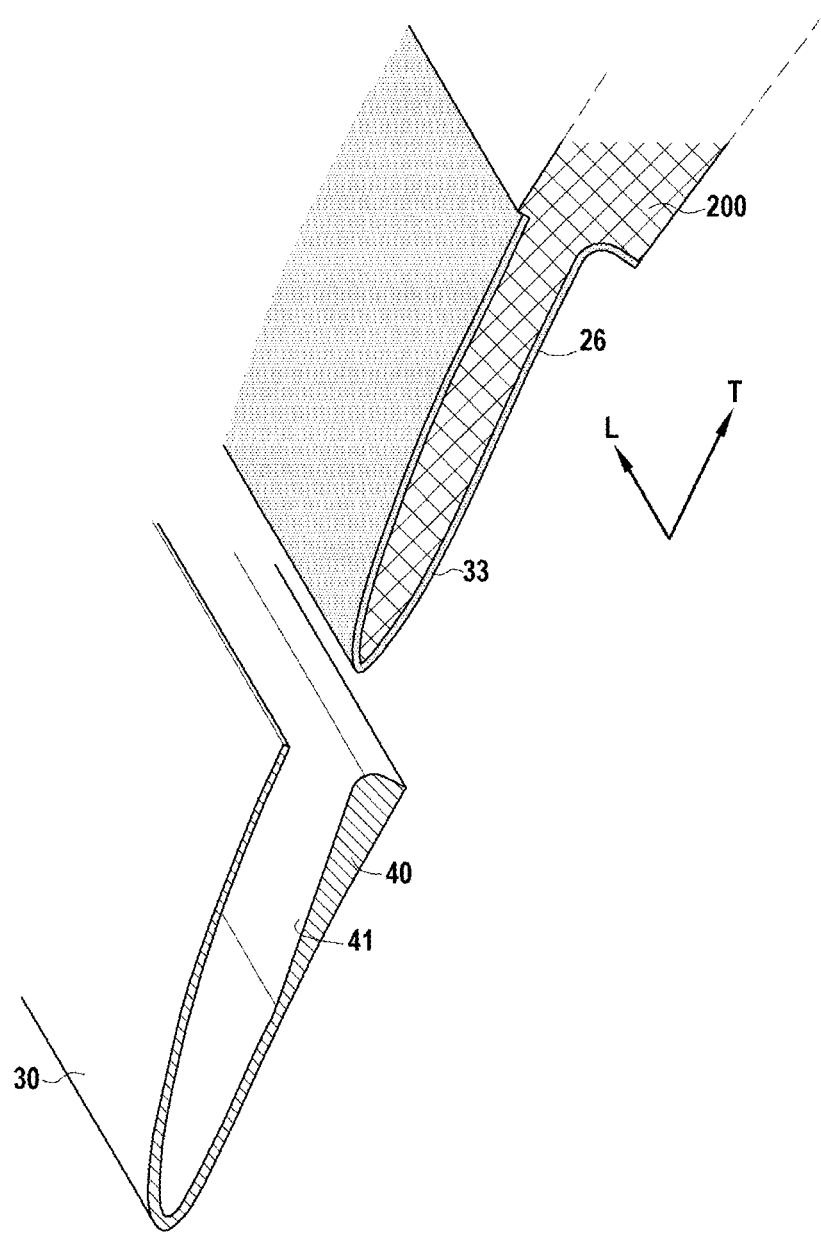

[Fig. 8B]
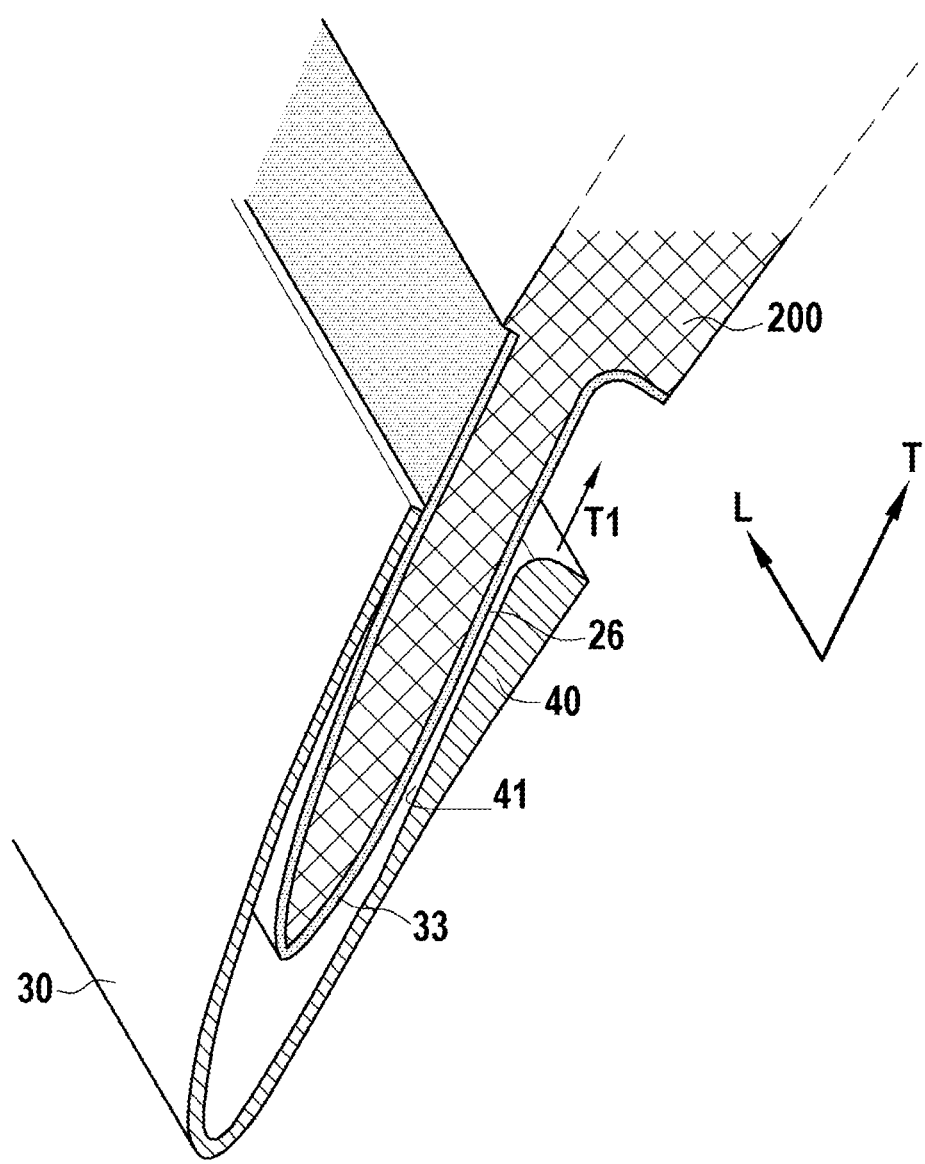

[Fig. 8C]
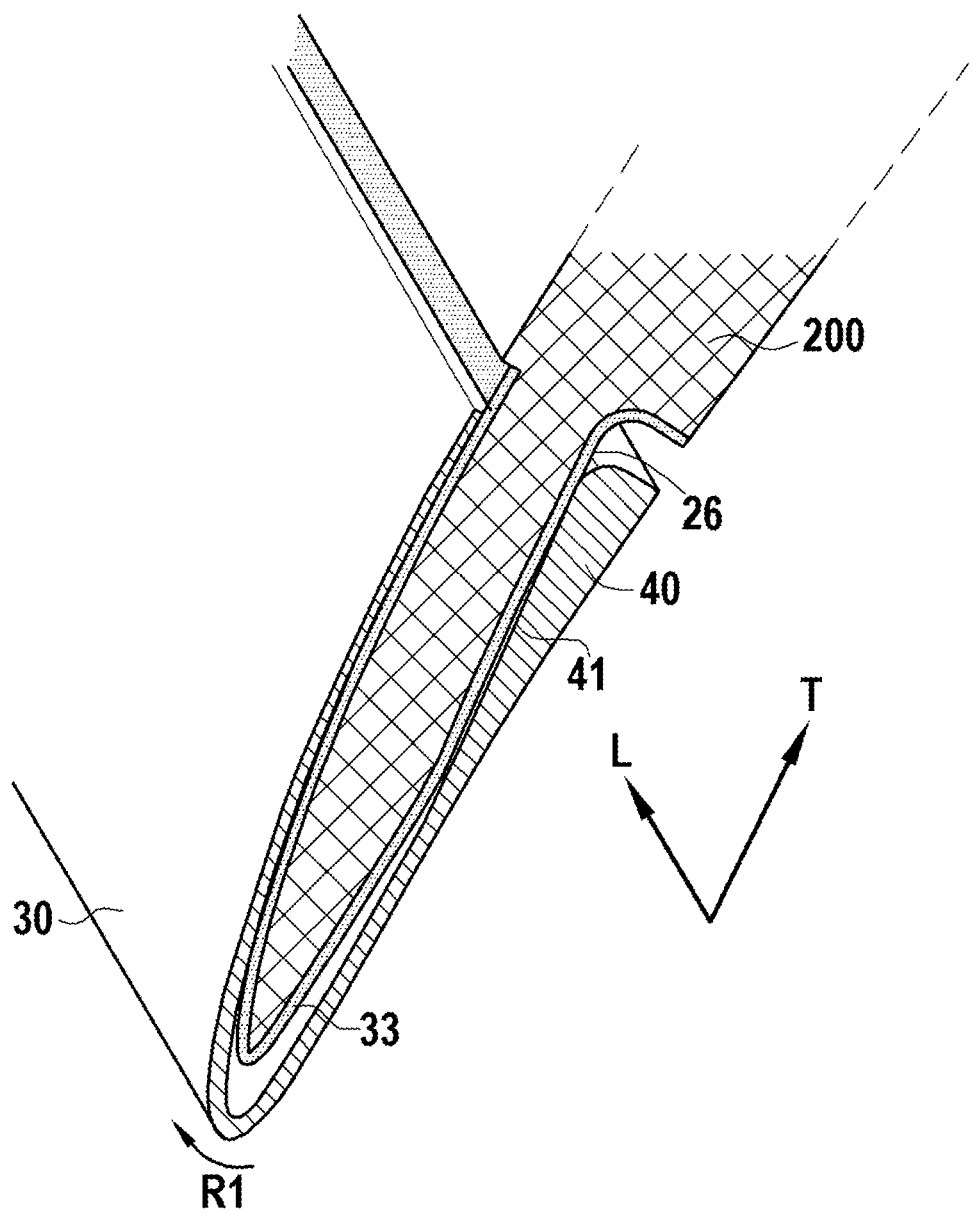

[Fig. 8D]
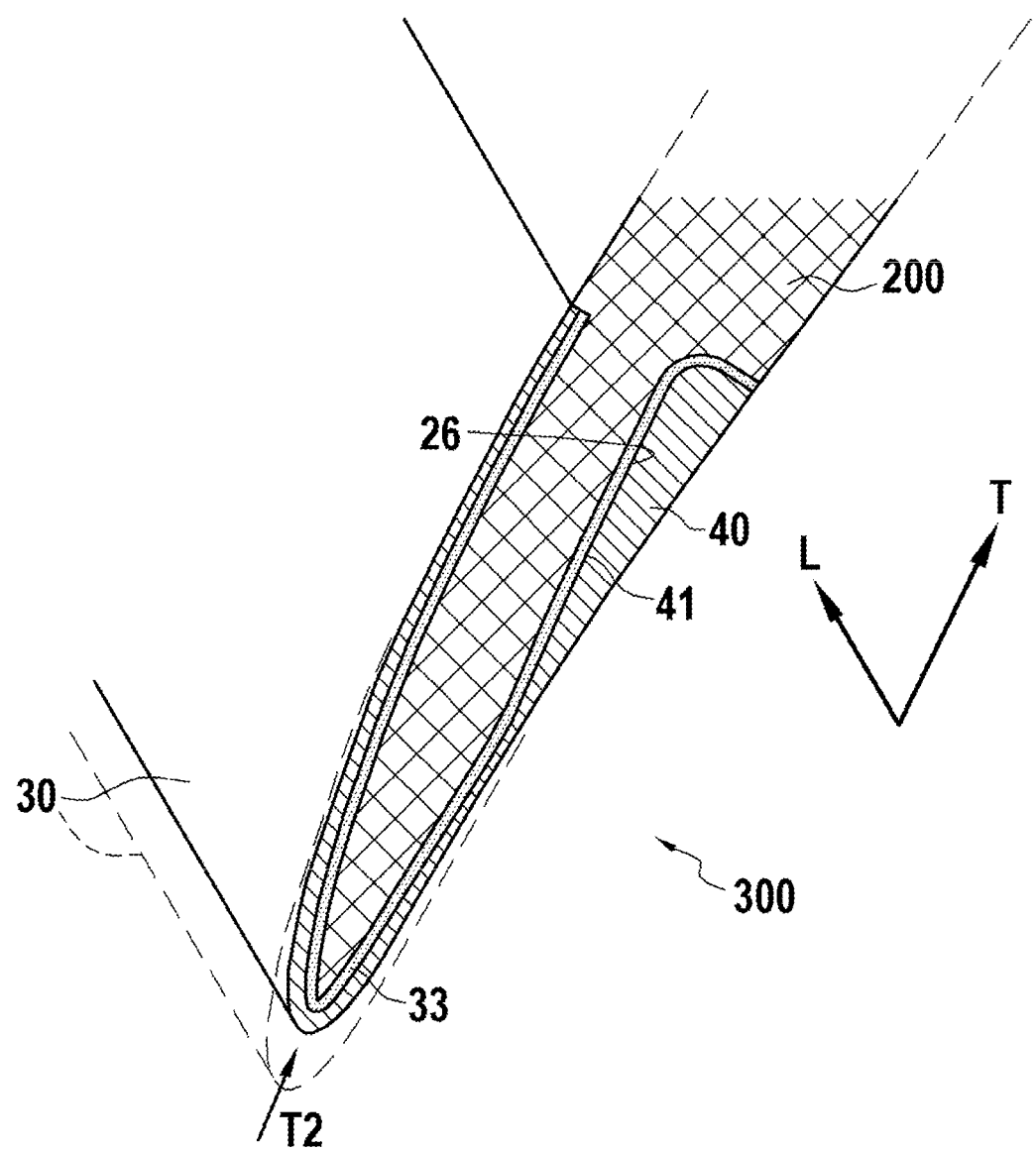

[Fig. 9]
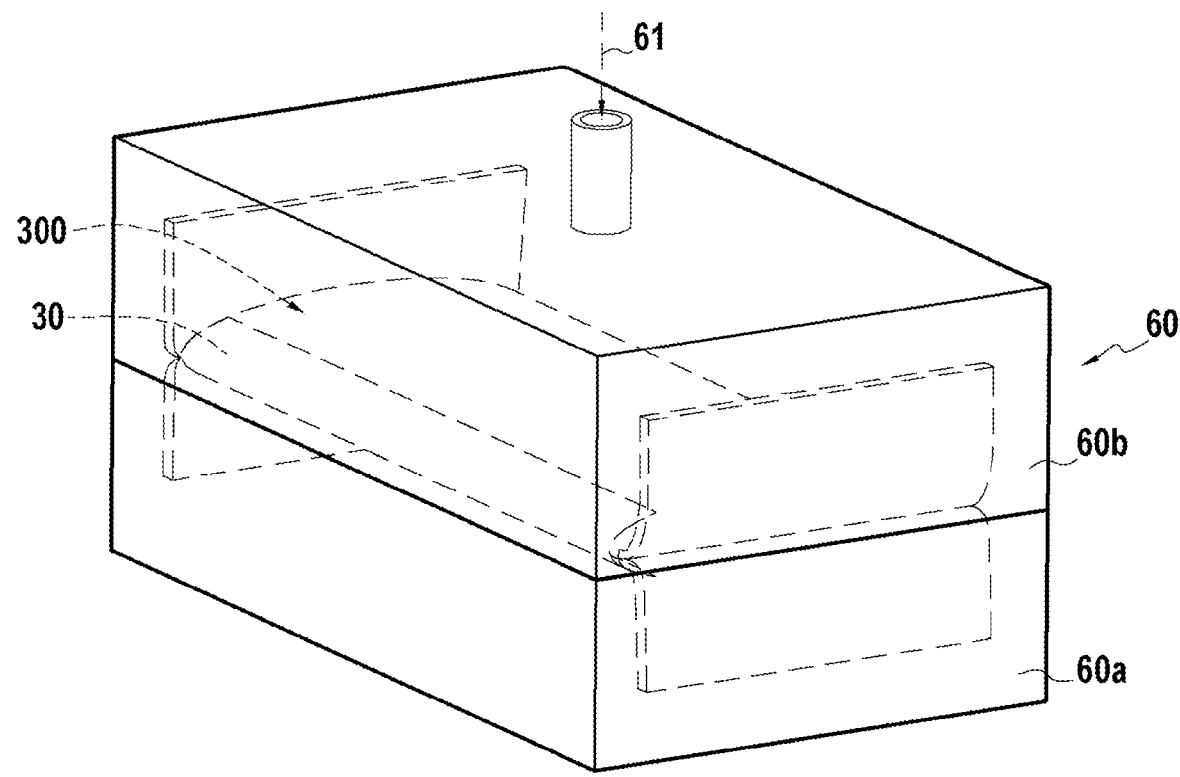

TURBOMACHINE VANE WITH INTEGRATED METAL LEADING EDGE AND METHOD FOR OBTAINING IT

CROSS REFERENCE TO RELATED APPLICATIONS

This application claims priority to French Patent Application No. 1905301, filed May 21, 2019, the entire content of which is incorporated herein by reference in its entirety.

FIELD

The present invention relates to the general field of manufacturing vanes for aeronautical gas turbomachines, or aeronautical turbomachines, made of composite material comprising an integrated metal leading edge.

BACKGROUND

The presence of a metal foil on the leading edge of an aeronautical turbomachine vane made of composite material allows protecting the composite blading from abrasion/erosion and during the impact of a foreign body. This is particularly the case for fan blades of an aeronautical turbomachine which are exposed to the ingestion of a bird, hail, ice, etc.

There are many methods for producing a gas turbomachine vane made of composite material. For example, the manual laminate/draping method, the molding method by injecting a fibrous preform (also called RTM for "Resin Transfer Molding"), the embroidery method, the thermocompression method, etc. can be mentioned. These methods are mainly based on the use of a thermosetting or thermoplastic resin.

Once the composite material vane has been obtained, it is then necessary to assemble the protective metal foil on its leading edge. To this end, the metal foil, which is produced by mechanical methods such as stamping, forming or electroforming for example, can be bonded on the leading edge of the composite material vane. This operation can be carried out in a mold ensuring the bonding of the metal foil or in an oven to obtain a crosslinking of the bead of adhesive applied if necessary to the foil. This method for directly bonding the foil requires numerous preparation operations which increase the duration and the cost of manufacturing the vane.

Document WO 2015015091 discloses a method for manufacturing a composite material vane with an integrated metal leading edge, in which a fibrous preform of the vane is placed in an injection mold with a metal foil, a resin is injected under pressure into the mold to overmold the foil, the resin is solidified and the vane thus obtained is demolded. However, this method has disadvantages. The metal foil is difficult to position in the mold with the fibrous preform which is not yet densified. Injecting the resin under pressure can cause the foil to move in the mold. This can lead to defects in the aerodynamic profile of the vane obtained, which is undesirable.

There is therefore a need for a method for manufacturing a turbomachine vane made of composite material with an integrated metal leading edge, and for such a vane, which does not have the aforementioned disadvantages.

SUMMARY

To this end, an aspect of the invention provides a turbomachine vane which comprises a blading made of composite material with fibrous reinforcement densified by a matrix and an integrated metal leading edge, the blading extending in a longitudinal direction, the leading edge being formed by a metal foil overmolded onto the blading, the foil being asymmetrical and having a lower wing and an upper wing which extend respectively on the lower and upper faces of the blading while matching an aerodynamic profile of the vane.

According to an aspect of the invention, one of the lower wing and the upper wing has a positioning portion extending in the longitudinal direction, the portion having a flat inner face and an increasing thickness away from the leading edge, the portion being housed in a correspondingly shaped groove in the blading.

The vane according to the invention is remarkable by the shape of the metal foil which is integrated therein. Indeed, the latter has a positioning portion which allows an easy positioning of the foil on the blading, and a retention of the foil during the vane manufacturing method during the overmolding of the foil. The inner face (that is to say which is located on the side of the blading) of the positioning portion forms an inclined plane relative to an outer face (that is to say which is located opposite the inner face) thereof. The flatness and the inclination (obtained by the fact that the thickness of the portion increases as it moves away from the leading edge) of the inner face allows bringing the foil to the blading by a translation along the face. Thus, better guidance of the foil is obtained when it is positioned on the blading, without significantly deforming it. The disadvantages related to the displacement of the foil during its overmolding are also avoided.

In an exemplary embodiment, the positioning portion may extend over a length comprised between 50% and 80% of the length of the corresponding wing measured between the leading edge and a trailing edge opposite the leading edge, that is to say measured in a transverse direction of the blading which is perpendicular to the longitudinal direction.

In an exemplary embodiment, an angle between the inner face of the positioning portion and an outer face of the portion can be comprised between 10° and 40°, for example comprised between 10° and 20°. Such an angle allows a good compromise between easy assembly and sufficient retention of the foil on the blading.

In an exemplary embodiment, the positioning portion may have a triangular-shaped section.

In an exemplary embodiment, with the exception of the positioning portion, the metal foil can have a substantially constant thickness. Such a foil is simple and inexpensive in design.

In an exemplary embodiment, the positioning portion may beneficially be present on the lower wing of the metal foil.

In an exemplary embodiment, an adhesive film, for example epoxy, may be present between the metal foil and the blading.

In an exemplary embodiment, the vane may constitute an outlet guide vane, an inlet guide vane, a fan blade, or a variable pitch vane.

According to another aspect, the invention also relates to a method for manufacturing a turbomachine vane such as that presented above, the method successively comprising:
  providing the metal foil and a fibrous preform intended to form the blading,
  positioning the metal foil on the fibrous preform so as to form a vane preform,
  placing the vane preform in the cavity of a mold having the shape of the vane, injecting a resin into the mold so as to overmold the foil on the blading, compacting the assembly and solidifying the resin, and demolding the vane obtained.

Such a resin injection molding method is also known in under the abbreviation RTM for "Resin Transfer Molding".

In an exemplary embodiment, the fibrous preform can be obtained by shaping a fibrous blank produced by three-dimensional weaving.

BRIEF DESCRIPTION OF THE DRAWINGS

FIG. 1 is a view in axial half-section of an aeronautical turbomachine which can incorporate a vane according to an embodiment of the invention.

FIG. 2 shows a view of a vane according to an embodiment of the invention.

FIG. 3 shows a cross-sectional view of the vane of FIG. 2.

FIG. 4 is a flowchart showing the different steps of a method for manufacturing a vane according to an embodiment of the invention.

FIG. 5 shows a fibrous blank intended to form the fibrous reinforcement of a vane according to an embodiment of the invention.

FIG. 6 illustrates the step of shaping the fibrous blank to obtain a fibrous blading preform.

FIG. 7 illustrates the step of positioning the metal foil on the blading fibrous preform so as to form a vane preform.

FIGS. 8A to 8D detail the step of positioning the metal foil on the blading fibrous preform. Particularly, FIG. 8A shows a first sub-step of positioning the foil on the blading fibrous preform.

FIG. 8B shows a second sub-step of positioning the foil on the blading fibrous preform.

FIG. 8C shows a third sub-step of positioning the foil on the blading fibrous preform.

FIG. 8D shows a fourth sub-step of positioning the foil on the blading fibrous preform.

FIG. 9 illustrates the step of placing the vane preform in a mold and injecting resin therein.

DETAILED DESCRIPTION

The overall architecture of an aeronautical turbomachine that can incorporate a vane according to an embodiment of the invention will be described in connection with FIG. 1, which shows an axial half-section of a turbomachine whose main axis is designated X-X.

Upstream in the direction of flow of the gas flow, the turbomachine 1 comprises a fan 2 for the air intake. At the outlet of the fan 2, the air flow splits in two. A first part of the air flow is sent to a low pressure compressor 3 then a high pressure compressor 4. This first part of the air flow is then injected into a combustion chamber 5, at the outlet of which it drives a turbine 6. A second part of the air flow, at the outlet of the fan 2, is sent to a rectifier 10 to be rectified and then mixed with the gases leaving the turbine 6. The second part of the air flow can be used, in part, for cooling the turbomachine 1.

More particularly, the rectifier 10 comprises a set of vanes 20 arranged radially between an inner annular body or inner casing 12 and an outer annular body or outer casing 14. These vanes 20 are sometimes called outlet guide vanes or lead-out vanes ("Outlet Guide Vane" or OGV).

FIG. 2 shows in more detail a vane 20 according to an embodiment of the invention. The vane 20 comprises a blading 21 which extends in a longitudinal direction L, corresponding to a radial direction when the vane 20 is mounted in the turbomachine, between an inner platform 22 and an outer platform 23. The blading 21 extends in a transverse direction T between a leading edge 21a and a trailing edge 21b.

The blading 21 is made of composite material with fibrous reinforcement densified by a matrix. The fibrous reinforcement may comprise carbon fibers, and the matrix may be of the organic type and obtained from a densification resin. Alternatively, the fibrous reinforcement may comprise ceramic fibers, for example made of silicon carbide, and a ceramic matrix.

The leading edge 21a of the blading 21 is covered by a metal foil 30 which is overmolded onto the blading 21 during a method which will be described later. This allows the vane 20 to have an integrated metal leading edge. The blading 21 has a lower face 24 and an upper face 25 (FIG. 3), over which the metal foil 30 partially extends. The blading 21 and the metal foil 30 together define an aerodynamic profile of the vane 20. The metal foil 30 may for example be made of a nickel and cobalt alloy.

FIG. 3 shows a sectional view of the blading 21 along plane III of FIG. 2.

The metal foil 30 comprises a lower wing 31 and an upper wing 32 which extend respectively over a part of the lower face 24 and a part of the upper face 25 of the blading 21. The wings 31 and 32 are integrated into the blading 21 so that they match the aerodynamic profile of the vane 20 by defining a part of this aerodynamic profile.

According to an embodiment of the invention, one of the lower wing 31 and the upper wing 32 comprises a positioning portion 40. The positioning portion 40 is here located in the vicinity of the free end of the wing (that is to say the end of the wing opposite the leading edge 21a). By having a positioning portion 40 only on one of its wings 31 or 32, the metal foil 30 is thus asymmetrical.

In exemplary embodiments, only one of the lower wing 31 and the upper wing 32 comprises the positioning portion 40. In this example, it is the lower wing 31 which comprises the positioning portion 40. The positioning portion 40 here extends along the free end of the lower wing 31 in the longitudinal direction L. Particularly, in this example, the positioning portion 40 is located at the border of the lower wing 31.

The positioning portion 40 is housed in a groove 26 of corresponding shape in the blading 21. The positioning portion 40 has a flat face 41 in contact with the blading 21 at the groove 26, which forms an inclined plane relative to an outer face 42 of the portion. The thickness E of the positioning portion 40 increases as it moves away from the leading edge 21a. Particularly, the angle A between the inner face 41 and the outer face 42 can be comprised between 10° and 40°, for example between 10° and 20°.

In this example, the positioning portion 40 has a generally triangular-shaped section.

In this example, the blading 21 and the foil 30 are assembled so as to form a half-dovetail connection, the blading 21 forming a pin which is inserted into a complementary groove formed by the foil 30 and its positioning portion 40.

With the exception of the positioning portion 40, the metal foil 30 may have a substantially constant thickness E0 (e.g. +/−10%), comprised for example between 4 mm and 10 mm. At its maximum, the thickness E1 of the foil 30 at the positioning portion 40 can be comprised between 4 mm and 10 mm.

The positioning portion may have a length L1 measured in the transverse direction T which is comprised between 50% and 80% of the length L0 of the lower wing 31 measured in the same way. In this example, the positioning portion 40 extends longitudinally (in the direction L) over the entire length of the metal foil 30.

According to the manufacturing method implemented, an adhesive film 33 may be present between the metal foil 30 and the blading 21.

FIG. 4 shows the different steps of an example of a method for manufacturing a vane 20 according to an embodiment of the invention, which will be described in connection with FIGS. 5 to 9.

A first step S1 of the method consists in providing the metal foil 30. The latter can for example be obtained by additive manufacturing, forming of a metal sheet, stamping, or casting, in a manner known per se.

In a step S2, carried out at the same time as step S1 or separately therefrom, a woven fibrous blank 100 (FIG. 5) is provided which is intended to form the fibrous reinforcement of the blading 21. The fibrous blank 100 can be obtained by three-dimensional weaving of threads or strands, in a manner known per se.

Then, the blank 100 can be shaped during a step S3 (FIG. 6) in a tool 50 adapted to obtain a blading fibrous preform 200. The platforms 22 and 23 can be formed by unbinding at the time of weaving and unfolding of the unbound parts at the time of shaping the blank. During this step S3, a foam core 110 can be inserted into the blank 100 if it is desired to form a hollow vane.

Then, in step S4, the metal foil 30 is positioned on the preform 200 (FIG. 7). More specifically, the positioning of the foil can be carried out in several sub-steps as illustrated in FIGS. 8A to 8D.

The fibrous preform 200 or the foil 30 can optionally be coated with an adhesive film, for example epoxy, to increase the strength of the assembly.

Then, as illustrated in FIGS. 8A and 8B, the foil 30 is approached by ensuring that the inner face 41 which forms an inclined plane is parallel to the corresponding face of the groove 26 of the fibrous preform 200, and a translation T1 is performed while maintaining this parallelism without completely depressing the foil 30.

Then, as illustrated in FIG. 8C, a rotation R1 of the foil in the lower surface to the outer surface direction is performed in order to center the foil 30 on the preform 200 so that the leading edge of the foil 30 is aligned with the leading edge of the preform 200.

Finally, as illustrated in FIG. 8D, a translation T2 is performed to complete the positioning of the foil 30 and to block it on the fibrous preform 200. After step S4, the foil 30 is positioned correctly and held firmly on the fibrous preform 200. A vane preform 300 is thus obtained.

In step S5, the vane preform 300 is placed with the metal foil 30 in the cavity of an injection mold 60 (FIG. 9) consisting for example of a mold lower part 60*a* and a mold upper part 60*b*, for carrying out a resin injection molding method (RTM).

One can then proceed in step S6 with injecting a densification resin 61 into the mold 60 containing the preform 300 with the foil 30 to overmold the foil.

The densification resin used in the injection molding method may be a thermosetting resin belonging to the family of epoxides, bismaleimides, polyimides, polyesters, vinyl esters, cyanate esters, phenolics, etc. Alternatively, the resin may be a thermoplastic resin of the phenylene polysulfide (PPS), polysulfone (PS), polyethersulfone (PES), polyimide-imide (PAI), polyetherimide (PEI) type, or else of the polyaryletherketone (PAEK) family: PEK, PEKK, PEEK, PEKKEK, etc.

The entire mold 60 can be compacted by applying a pressure, to ensure proper impregnation of the preform by the resin, and obtain the desired shape for the vane. The solidification of the resin is obtained by heating or regulating the temperature of the mold according to the type of resin used. The vane 20 is finally demolded and can be machined if necessary.

The invention was illustrated in its application to an input guide vane 20 of an aeronautical turbomachine. It should be noted that it can be applied to other types of turbomachine vanes, such as an output guide vane, a fan blade, a variable pitch vane, etc.

The invention claimed is:

1. A vane for a turbomachine comprising a blading made of composite material with fibrous reinforcement densified by a matrix and an integrated metal leading edge, the blading extending in a longitudinal direction, the leading edge being formed by a metal foil overmolded onto the blading, said metal foil being asymmetrical and having a lower wing and an upper wing which extend respectively on lower and upper faces of the blading while matching an aerodynamic profile of the vane,
    wherein one of the lower wing and the upper wing has a positioning portion extending in the longitudinal direction, said positioning portion having a flat inner face and an increasing thickness away from the leading edge, said positioning portion being housed in a correspondingly shaped groove in the blading,
    and wherein the positioning portion extends over a length comprised between 50% and 80% of the length of the corresponding wing measured between the leading edge and a trailing edge opposite the leading edge.

2. The vane according to claim 1, wherein an angle between the inner face of the positioning portion and an outer face of said positioning portion is comprised between 10° and 40°.

3. The vane according to claim 1, wherein the positioning portion has a triangular-shaped section.

4. The vane according to claim 1, wherein, with the exception of the positioning portion, the metal foil has a substantially constant thickness.

5. The vane according to claim 1, wherein the positioning portion is present on the lower wing of the foil.

6. The vane according to claim 1, wherein an adhesive film is present between the foil and the blading.

7. The vane according to claim 1, constituting an outlet guide vane, an inlet guide vane, a fan vane, or a variable pitch vane.

8. A method for manufacturing the turbomachine vane according to claim 1, the method successively comprising:
    providing the metal foil and a fibrous preform intended to form the blading,
    positioning the metal foil on the fibrous preform so as to form a vane preform,
    placing the vane preform in a cavity of a mold having the shape of the vane,
    injecting a resin into the mold so as to overmold the metal foil on the blading, compacting the assembly and solidifying the resin, and
    demolding the vane obtained.

9. The method according to claim 8, wherein the fibrous preform is obtained by shaping a fibrous blank produced by three-dimensional weaving.

* * * * *